(12) United States Patent
Hiyoshi et al.

(10) Patent No.: US 7,191,741 B2
(45) Date of Patent: Mar. 20, 2007

(54) PIN CONNECTED LINK MECHANISM

(75) Inventors: Ryosuke Hiyoshi, Kanagawa (JP); Kenshi Ushijima, Kanagawa (JP); Yoshiaki Tanaka, Kanagawa (JP); Shunichi Aoyama, Kanagawa (JP); Katsuya Moteki, Tokyo (JP); Naoki Takahashi, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 597 days.

(21) Appl. No.: 10/662,402

(22) Filed: Sep. 16, 2003

(65) Prior Publication Data

US 2004/0112169 A1 Jun. 17, 2004

(30) Foreign Application Priority Data

Dec. 16, 2002 (JP) .............................. 2002-363228

(51) Int. Cl.
*F02B 75/04* (2006.01)
(52) U.S. Cl. .................... 123/48 B; 74/579 R
(58) Field of Classification Search .............. 123/48 R, 123/48 B, 78 E, 197.3; 74/579 R, 579 E
See application file for complete search history.

(56) References Cited

U.S. PATENT DOCUMENTS

| | | | |
|---|---|---|---|
| 1,959,279 A | * | 5/1934 | Stearns ........................ 92/157 |
| 5,309,779 A | | 5/1994 | Sarno |
| 6,083,240 A | | 7/2000 | Ouchi |
| 2002/0002957 A1 | * | 1/2002 | Moteki et al. ............ 123/48 B |
| 2002/0026910 A1 | | 3/2002 | Hiyoshi et al. |
| 2006/0101939 A1 | * | 5/2006 | McEwan .................. 74/579 R |

FOREIGN PATENT DOCUMENTS

| EP | 1 180 588 A2 | 2/2002 |
|---|---|---|
| JP | 2002-129995 A | 5/2002 |

* cited by examiner

Primary Examiner—Tony M. Argenbright
Assistant Examiner—Katrina Harris
(74) Attorney, Agent, or Firm—Foley & Lardner LLP

(57) ABSTRACT

A link mechanism usable for a variable compression ratio mechanism of an internal combustion engine includes first and second links pivotally connected by a pin inserted through cylindrical first and second pin boss portions of the first and second links. Each of the first and second pin boss portions includes a circumferentially extending first narrow section, and a circumferentially extending first wide section having an axial wall thickness greater than the axial wall thickness of the first narrow section. The wide sections of the first and second pin boss portions are overlapped in an region extending in the axial direction of the pin.

13 Claims, 16 Drawing Sheets

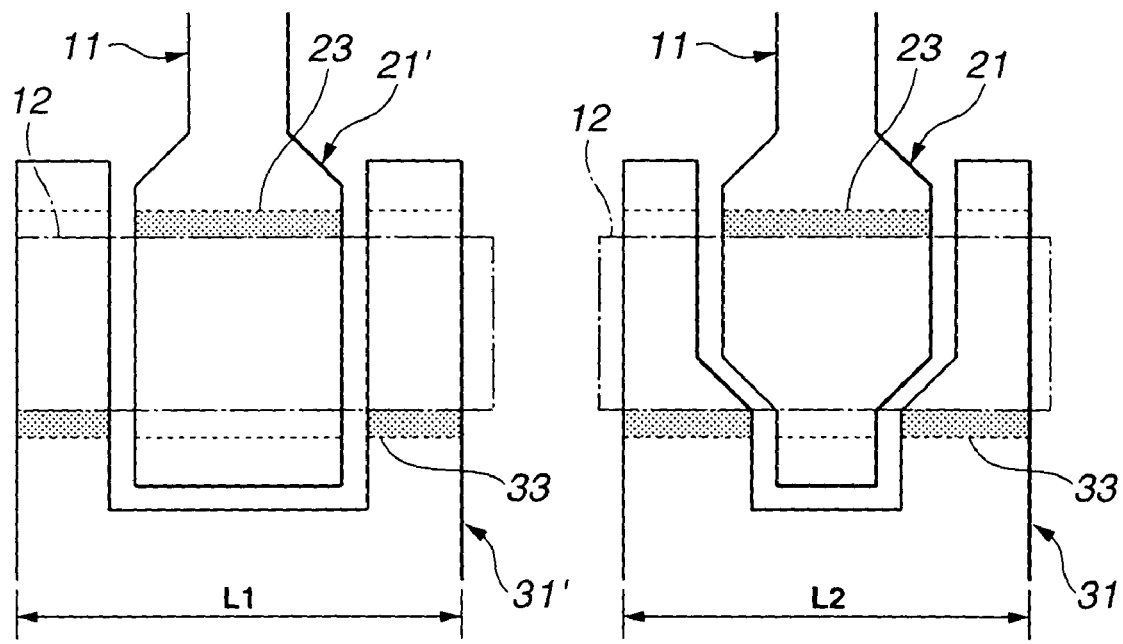

PIN CONNECTED LINK MECHANISM

BACKGROUND OF THE INVENTION

The present invention relates to a link mechanism or a pin connected link mechanism specifically suitable for a multi-link type variable compression ratio mechanism.

US 2002/0026910 A1 (corresponding to Japanese Patent Application No. 2000-316020) discloses a multi-link type variable compression ratio mechanism for an internal combustion engine. This mechanism includes a linkage of upper link, lower link and control link.

SUMMARY OF THE INVENTION

It is an object of the present invention to provide a link mechanism to reduce an axial dimension of a link connecting structure, to improve the strength of the link connecting structure, and to lower the bending stress of a connecting pin.

According to one aspect of the present invention, a link mechanism comprises: a first link including a cylindrical first pin boss portion; a second link including a cylindrical second pin boss portion; and a connecting pin passing through the first and second pin boss portions so as to allow a relative rotational movement between the first and second links within a limited range. The first pin boss portion includes a first narrow section extending in a circumferential direction of the first pin boss portion, and having an axial wall thickness as measured in an axial direction of the connecting pin. The first pin boss portion further includes a first wide section extending in the circumferential direction of the first pin boss portion, and having an axial wall thickness greater than the axial wall thickness of the first narrow section. The second pin boss portion includes a second narrow section extending in a circumferential direction of the second pin boss portion, and having an axial wall thickness as measured in the axial direction. The second pin boss portion includes a second wide section extending in the circumferential direction of the second pin boss portion, and having an axial wall thickness greater than the axial wall thickness of the second narrow section. The first wide section of the first pin boss portion and the second wide section of the second pin boss portion overlap each other in the axial direction.

According to another aspect of the invention, a piston crank mechanism for varying a compression ratio of an internal combustion engine, comprises: a lower link mounted rotatably on a crank pin of the engine; an upper link connecting the lower link with a piston of the engine; a control link including a first end connected with the lower link; and a support point adjusting mechanism connected with a second end of the control link and arranged to shift a support point of the second end of the control link to vary a compression ratio of the engine. One of the lower link, the upper link and the control link is a first link. A second link (13, 13A, 11, 15) is another of the lower link, the upper link and the control link. The first link includes a cylindrical first pin boss portion. The second link includes a cylindrical second pin boss portion connected with the first pin boss portion by a connecting pin passing through the first and second pin boss portions so as to allow a relative rotational movement between the first and second links. The first pin boss portion includes a first narrow section extending in a circumferential direction of the first pin boss portion, and having an axial wall thickness as measured in an axial direction of the connecting pin. The first pin boss portion further including a first wide section extending in the circumferential direction of the first pin boss portion, and having an axial wall thickness greater than the axial wall thickness of the first narrow section. The second pin boss portion includes a second narrow section extending in a circumferential direction of the second pin boss portion, and having an axial wall thickness as measured in the axial direction. The second pin boss portion includes a second wide section extending in the circumferential direction of the second pin boss portion, and having an axial wall thickness greater than the axial wall thickness of the second narrow section. The first wide section of the first pin boss portion and the second wide section of the second pin boss portion overlap each other in the axial direction.

BRIEF DESCRIPTION OF THE DRAWINGS

FIG. 13A is a schematic view illustrating a link connecting pin mechanism in a comparative example; and FIG. 13B is a schematic view illustrating the link mechanism in the first embodiment.

DETAILED DESCRIPTION OF THE INVENTION

Figure 1:
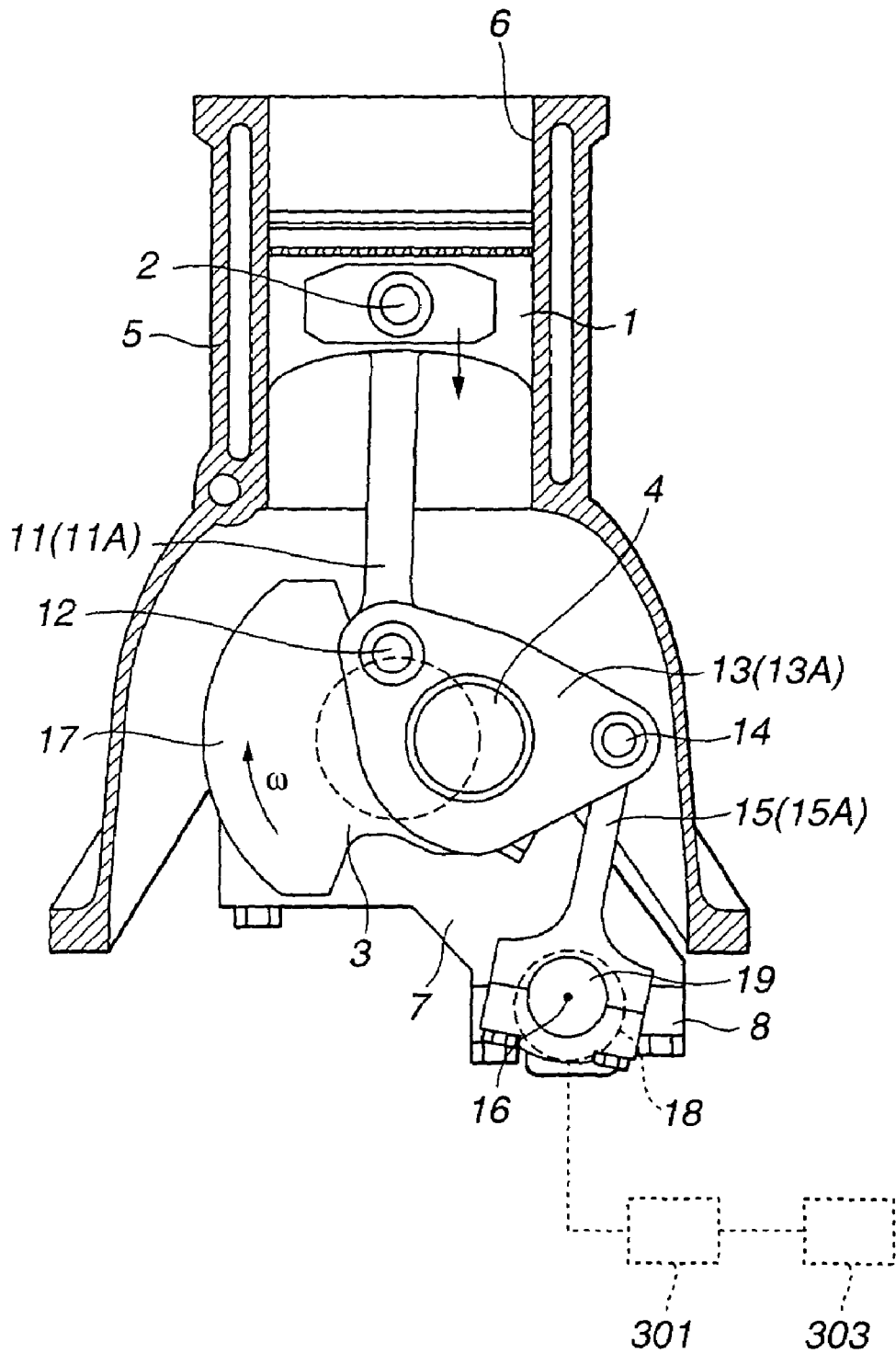
FIG. 1 is a schematic view showing a variable engine compression ratio mechanism including a link mechanism according to a first embodiment of the present invention.

FIG. 1 shows a variable compression ratio mechanism for an internal combustion engine according to a first embodiment of the present invention.

As shown in FIG. 1, a piston 1 is slidable in a cylinder 6 formed in a cylinder block 5. Piston 1 receives a combustion pressure in a combustion chamber defined on top of piston 1. A crank bearing bracket 7 shown in FIG. 1 supports crankshaft 3 rotatably in cylinder block 5.

The variable compression ratio mechanism of this embodiment is a multi-link type piston-crank mechanism. The variable compression ratio mechanism of this embodiment includes a link mechanism, or pin connecting mechanism, composed of a lower link (second link) 13 rotatably mounted on a crank pin 4 of crankshaft 3; an upper link (first or third link) 11 connecting lower link 13 and piston 1; a control link (third or first link) 15 having a first end connected with lower link 13; and an actuating section including a support position adjusting mechanism for shifting the position of a second end of control link 15 as a support point (or fulcrum) 16, relative to cylinder block 5 as a stationary member, to vary the engine compression ratio. Upper link 11 is connected swingably with piston 1 by a piston pin 2. Upper link 11 and lower link 13 are connected with each other by a first connecting pin 12. Lower link 13 and control link 15 are connected with each other by a second connecting pin 14. First connecting pin 12 is located on a first side (left side as viewed in FIG. 1) of crank pin 4, and second connecting pin 14 is located on a second side (right side of FIG. 1) of crank pin 4. Thus, first and second connecting pins 12 and 14 are located, respectively, on opposite sides of crank pin 4.

The actuating section of the variable compression ratio mechanism of this example includes a control shaft 18, an eccentric cam 19 and an actuator 301. Control shaft 18 extends in parallel to crankshaft 3 in the direction of engine cylinder row at a position below crankshaft 3 on one side (right side as viewed in FIG. 1) of crankshaft 3. Eccentric cam 19 is circular, and rotatable as a unit with control shaft 18. Eccentric cam 19 is fixedly mounted on control shaft 18 or eccentric cam 19 is an integral part of control shaft 18. The axis of eccentric cam 19 is displaced from the axis of control shaft 18. The actuator 301 is arranged to drive and rotate the control shaft 18. Control shaft 18 and eccentric cam 19 form the support position adjusting mechanism for shifting the position of the second end of control link 15 as a support point (or fulcrum) 16, relative to cylinder block 5, to vary the engine compression ratio.

Control link 15 includes a first end connected with lower link 13 by second connecting pin 14, and a second end rotatably connected with eccentric cam 19. The outer circumference of eccentric cam 19 is enclosed in the second end of control link 15, and the second end of control link 15 is rotatably mounted on eccentric cam 19. Control shaft 18 is rotatably supported on cylinder block 5 by the crank bearing bracket 7 and a control shaft bearing bracket 8.

To vary the compression ratio, an engine control unit 303 of a known type delivers a drive signal to the actuator 301 as in earlier technology, and thereby rotates control shaft 18. Therefore, the center 16 of eccentric cam 19 serving as the swing axis of control link 15 is shifted relative to cylinder block 5, and the constraint condition of lower link 13 by control link 15 is varied. In this way, the compression ratio varying mechanism can vary the engine compression ratio by varying the stroke characteristic of piston 1 with respect to the crank angle, specifically the potion of the top dead center of piston 1.

Thus, by rotating the control shaft 18 in a stepless manner, and holding control shaft 18 at a desired position, this compression ratio varying mechanism can vary the compression ratio continuously (in the stepless manner) in a wide range. Control shaft 18 is disposed in a region on one lateral side of crank shaft 3 below crank shaft 3 where it is relatively easy to find room for the mechanism. Therefore, this arrangement makes it possible to incorporate the compression ratio varying mechanism in engines of various types only with minor modification. The position of control shaft 18 obliquely below crank shaft 3 and just above the oil pan of the engine is advantageous for lubrication around control shaft 18 including sliding contact portions of eccentric cam 19 and control link 15.

FIGS. 2~17 show more in detail the variable compression ration mechanism according to the first embodiment. In this embodiment, the present invention is applied to the pin connected link structure of first connecting pin 12 between upper link (first link) 11 and lower link (second link) 13.

Figure 2:
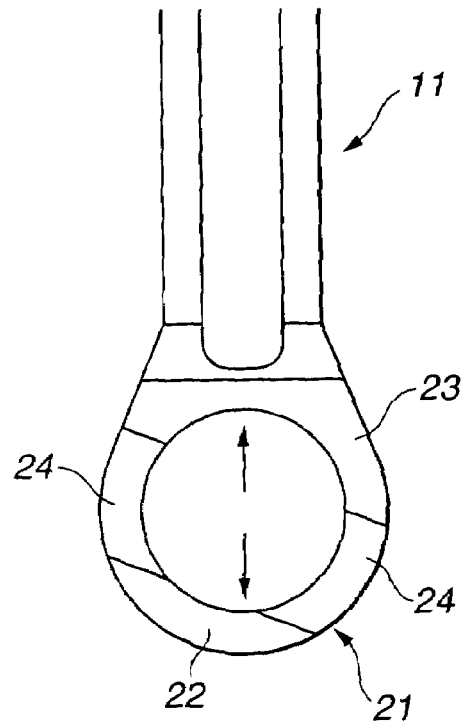
FIG. 2 is a front view showing a first pin boss portion of an upper link employed in the first embodiment.
Figure 3:
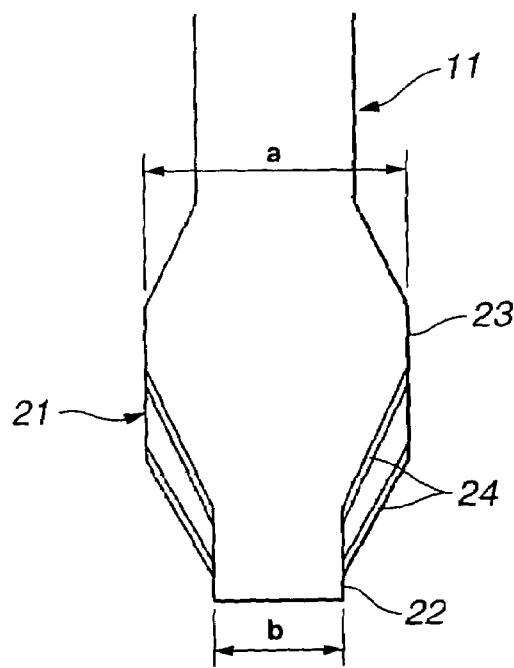
FIG. 3 is a side view showing the first pin boss portion of the upper link employed in the first embodiment.
Figure 4:
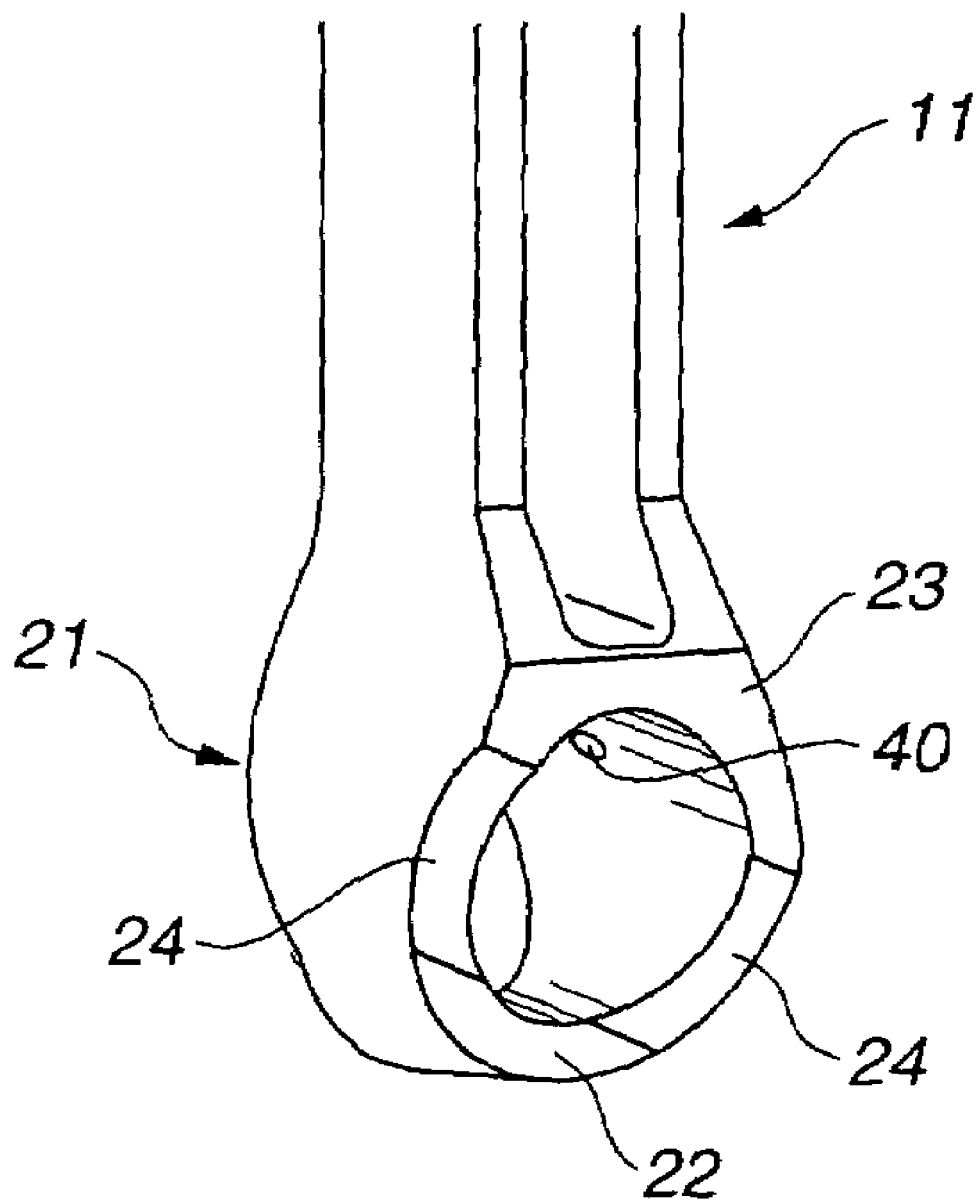
FIG. 4 is a perspective view showing the first pin boss portion of the upper link employed in the first embodiment.

As shown in FIGS. 2~4, upper link 11 includes, at the lower end, a first pin boss portion 21 shaped like a hollow cylinder. First pin boss portion 21 has a cylindrical wall defining a circular pin hole for receiving first connecting pin 12. The axial width of the cylindrical wall is not uniform in the circumferential direction around the pin hole. That is, the cylindrical wall of first pin boss portion 21 includes a first narrow section 22 having a constant axial width b; a first wide section 23 having a constant axial width a which is greater than the axial width b of first narrow section 22; and a pair of first slant sections 24 connecting the first narrow section 22 and first wide section 23 on both sides of the circular hole. Each first slant section 24 has end surfaces which are inclined with respect to a plane to which the axial direction is perpendicular. Each slant section 24 is tapered so that the axial width is decreased gradually from first wide section 23 toward first narrow section 22.

Figure 5:
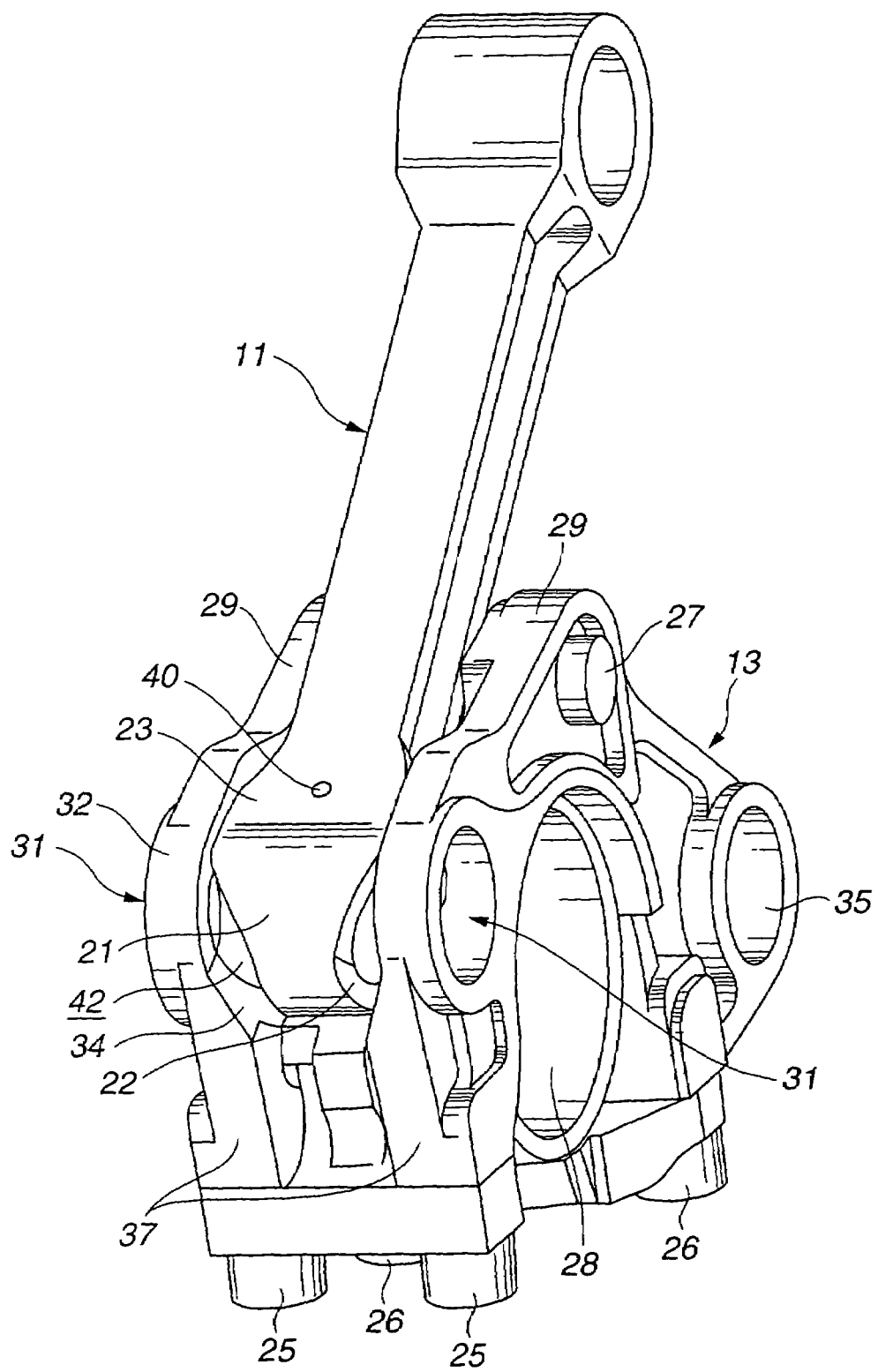
FIG. 5 is a perspective view showing an assembly of a lower link and the upper link shown in FIGS. 2~4.
Figure 6:
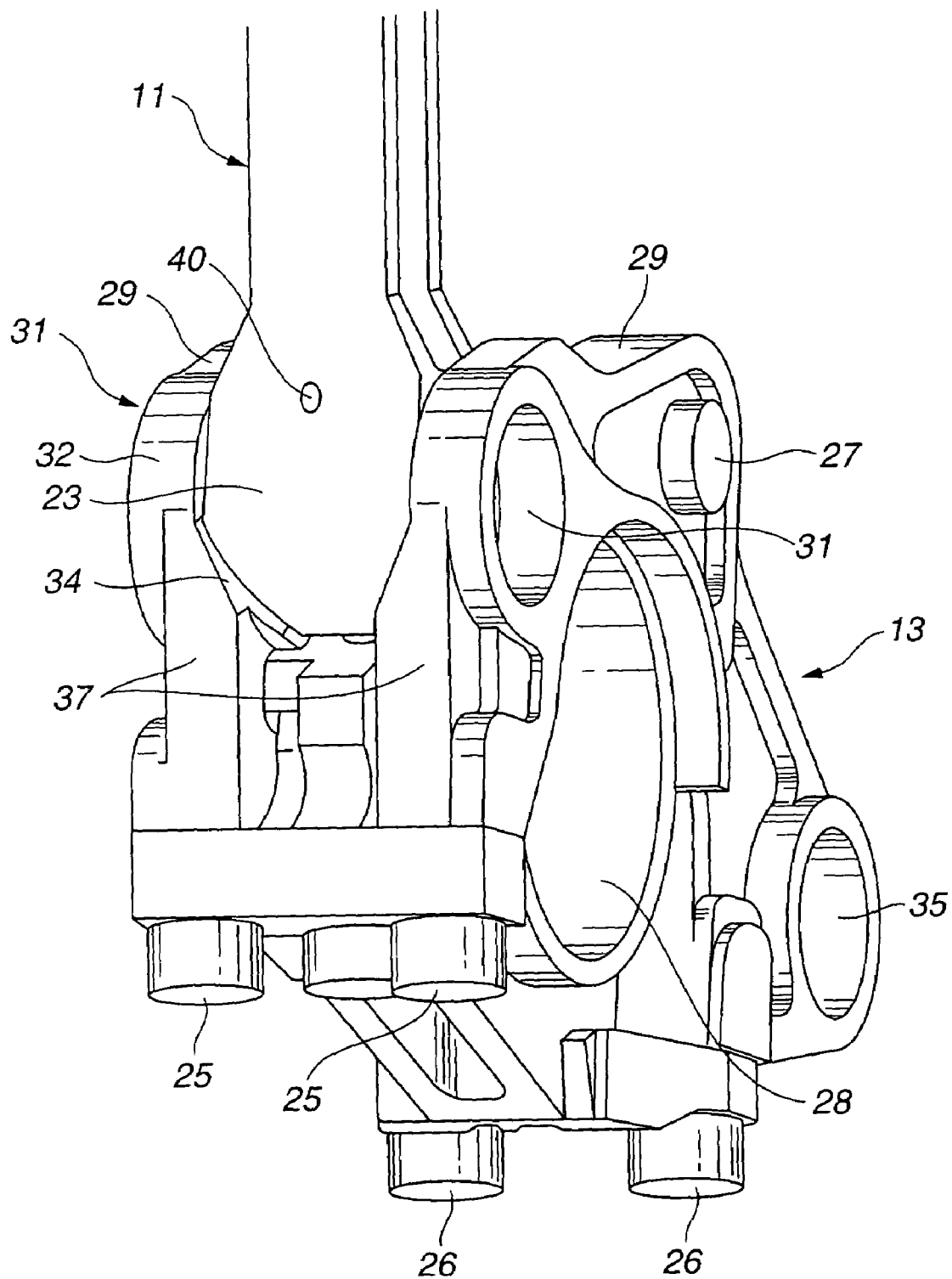
FIG. 6 is a perspective view showing the lower link connected with the upper link according to the first embodiment.
Figure 7:
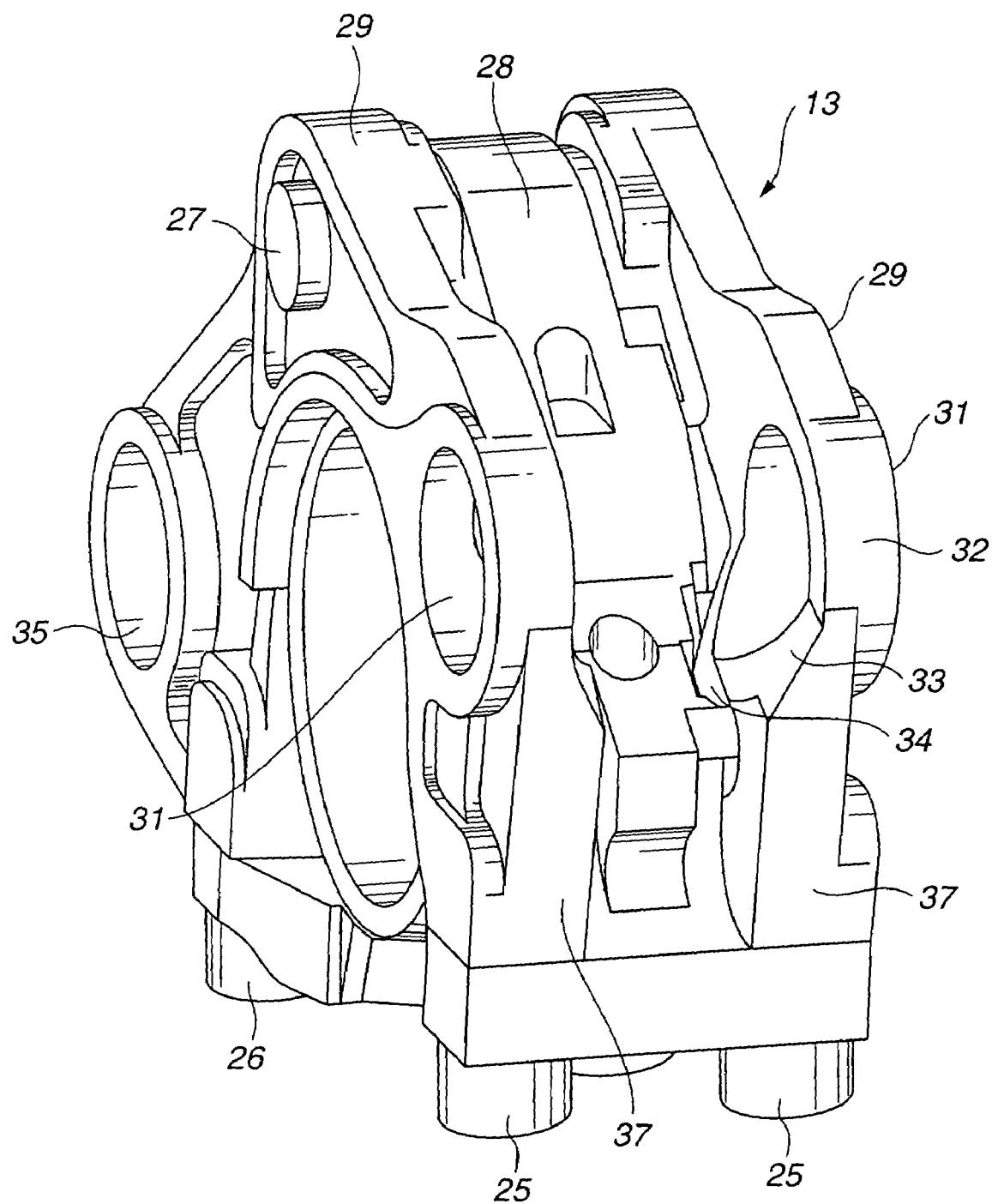
FIG. 7 is a perspective view showing the lower link alone.

As shown in FIGS. 5~7, lower link 13 of the first embodiment is an assembly of members joined together by bolts 25, 26 and 27. In this example, lower link 13 is mainly composed of a main bearing member 28 for supporting crank pin 4 rotatably, and a pair of plate-like side members 29 (each having a projecting portion serving as a side arm). Main bearing member 28 is sandwiched axially between the side members 29. Each side member 29 includes a second pin boss portion 31 shaped like a hollow cylinder arranged to receive first connecting pin 12; and a third pin boss portion 35 shaped like a hollow cylinder and arranged to receive second connecting pin 14. In this way, connecting pins 12 and 14 are supported by side members 29 separated from main bearing member 28 for supporting crank pin 4. This arrangement is advantageous for restraining adverse influence of bending deformation in one supporting member on the other supporting member.

Figure 8:
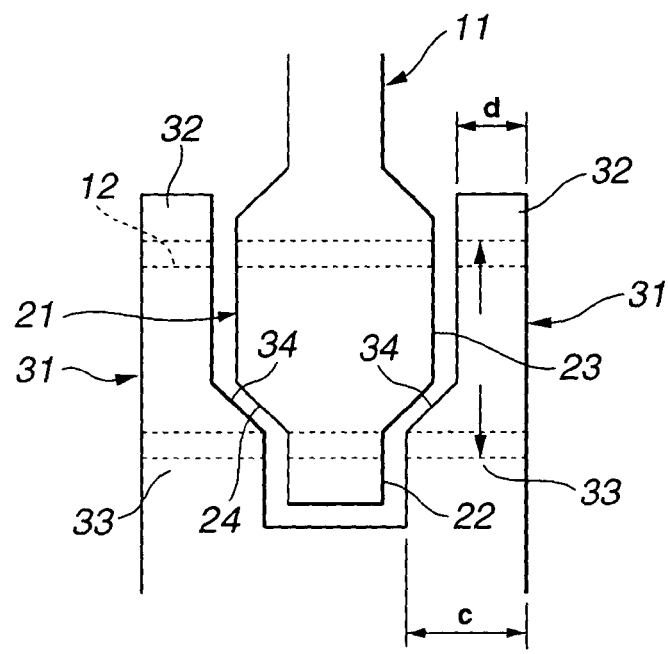
FIG. 8 is a schematic view illustrating directions of combustion load and exhaust inertial load in the link structure of this embodiment.
Figure 9:
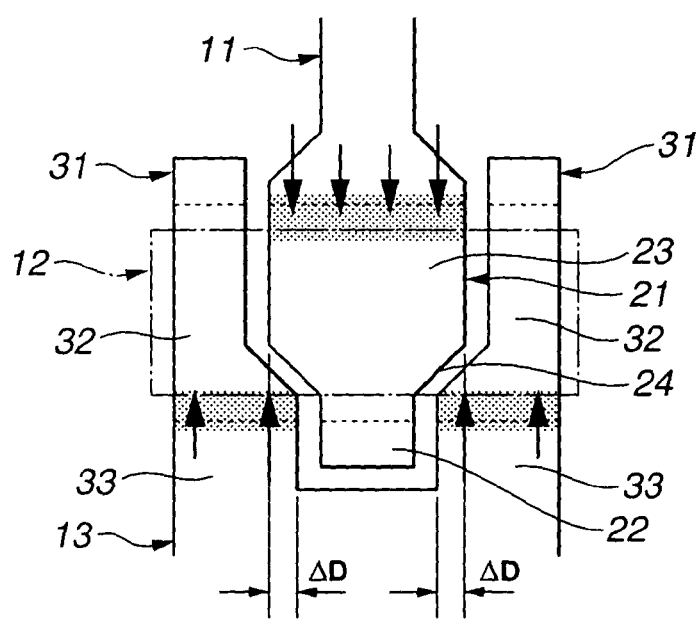
FIG. 9 is a schematic view illustrating direction of combustion load in the link structure of this embodiment.

As best shown in FIGS. 8 and 9, second pin boss portion 31 of each side has a cylindrical wall defining a circular hole. The axial width of the cylindrical wall is not uniform in the circumferential direction around the pin hole. That is, the cylindrical wall of second pin boss portion 31 includes a second narrow section 32 having a constant axial width d; a second wide section 33 having a constant axial width c which is greater than the axial width d of second narrow section 32; and a pair of second slant sections 34 connecting the second narrow section 32 and second wide section 33 on both sides of the circular pin hole. Each slant section 34 has end surfaces which are inclined with respect to a plane to which the axial direction is perpendicular. Each second slant section 34 is tapered so that the axial width is decreased gradually from second wide section 33 toward second narrow section 32.

First connecting pin 12 extends axially through the first (inner) pin boss portion 21 and the two second (outer) pin boss portions 31 on both axial sides of first pin boss portion 21, and thereby connects upper link 11 and lower link 13 pivotally. By the construction of the variable compression ratio mechanism, the relative rotation angle between upper link 11 and lower link 13 (that is, the swing angle of upper link 11 with respect to lower link 13) is limited to a predetermined angle (50~60°, for example). In this example, the relative rotation angle between links 11 and 13 is limited to about 55° in a high compression ratio setting state, and to about 50° in a low compression ratio setting state. First connecting pin 12 is attached to second pin boss portion 31 by a structure such as a full-float structure using washer or snap ring, or by press fitting so that first connecting pin 12 cannot be extracted axially from second pin boss portion 31. Similarly, the relative rotation angle between control link 15 and lower link 13 is limited to a predetermined angle (50~60°, for example).

First wide section 23 is shorter in circumferential length than second narrow sections 32. Therefore, irrespective of the position of piston 1, and the rotational position of control shaft 18, the first wide section 23 always confronts and adjoins the second narrow section 32 substantially with no clearance, in the axial direction on each side. Second wide section 33 of each side member 29 is shorter in circumferential length than first narrow section 22. Therefore, irrespective of the position of piston 1, and the rotational position of control shaft 18, the second wide section 33 of each side member 29 always confronts and adjoins the first narrow section 22 substantially with no clearance, in the axial direction. Therefore, first wide section 23 and each of the second wide sections 33 overlap each other over an axial width ΔD in the axial direction as shown in FIG. 9. Thus, as viewed from the direction of application of a combustion load based on the combustion pressure acting on piston 1, the first wide section 23 covers a part of second wide section 33 on each side member 29.

The inside cylindrical surfaces of pin boss portions 21 and 31 and the outside cylindrical surface of first connecting pin 12 receive combustion load due to combustion pressure acting on piston 1, and inertial load of upper and lower links 11 and 13. Especially, a great combustion load is applied near the compression top dead center, and an expansion inertial load is applied, in a direction substantially identical to the direction of the combustion load, near the expansion bottom dead center. The first and second wide sections 23 and 33 are arranged, as shown in FIGS. 8 and 9, with respect to the acting direction of the combustion load (and the expansion inertial load) so that the great combustion load and expansion inertial load act on the contact interface between the first connecting pin 12 and the first and second wide sections 23 and 33. In FIG. 2, an upward arrow in the circular pin hole of upper link 11 indicates a direction of combustion load, and a downward arrow indicates a direction of exhaust inertial load. In FIG. 8, an upward arrow in second pin boss portion 31 indicates the direction of the exhaust inertial load, and a downward arrow indicates the direction of the combustion load. In FIG. 9, combustion load is applied from upper link 11 to first connection pin 12 as shown by downward arrows. Moreover, combustion load is applied from each second pin boss portion 31 to first connecting pin 12 as shown by upward arrows in FIG. 9.

Figure 10:
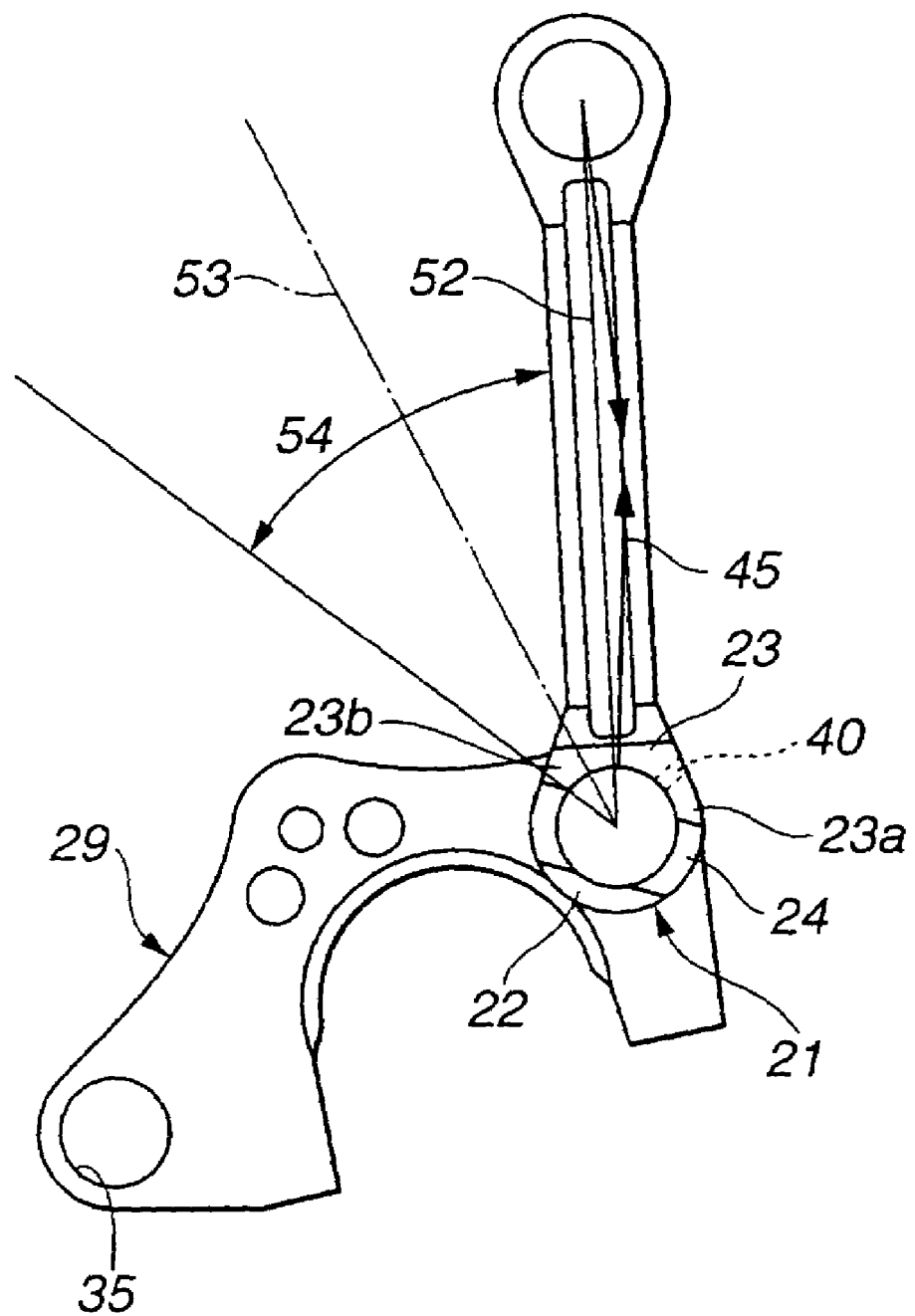
FIG. 10 is a schematic view illustrating the arrangement of links according to the first embodiment when a maximum combustion load is applied.

FIG. 10 shows the linkage in the state reached when the maximum combustion load is applied near the compression top dead center. A swing center line 53 shown in FIG. 10 is a bisector line diving a swing angle 54 into two equal angles. The swing angle is a swing angle of upper link 11 with respect to lower link 13. The swing center line 43 and swing angle 54 are preliminarily determined in accordance with the dimensions of layout of link elements constituting the variable compression ratio mechanism. By the influence of inertial load, a direction 45 of the maximum combustion load acting from first connecting pin 12 to first pin boss portion 21 is deviated, from a link center line 52 connecting a first link connecting pivot point of upper link 11 defined by the axis of piston pin 2 and a second link connecting pivot point of upper link 11 defined by the axis of first connecting pin 12, in the rotational direction of crank pin 4 (clockwise direction as viewed in FIG. 10), that is the direction away from crank pin 4.

The first narrow section 22, first wide section 23 and first slant sections 24 are approximately symmetrical with respect to this direction 45 of the maximum combustion load. Wide section 23 is located on the same side as the direction 45 whereas narrow section 22 is on the opposite side. As viewed in FIG. 10, the direction 45 is upward, and the wide section 23 is located on the upper side of the pin hole of first connecting pin 12. Wide section 23 and narrow section 22 confront each other across the pin hole. Each of wide section 23 and narrow section 22 extends circumferentially on both side of the direction 45 of the maximum combustion load, to approximately equal circumferential lengths. Therefore, the maximum combustion load acts approximately at the middle of the circumferential length of wide section 23.

Second pin boss portion 31 on each side is formed in the same manner as the first pin boss portion 21. Second narrow section 32 and second wide section 33 are approximately symmetrical with respect to this direction of the maximum combustion load applied from first connecting pin 12 to second pin boss portion 31. Each of second narrow section 32 and second wide section 33 extends circumferentially on both side of the direction of the maximum combustion load acting from first connecting pin 12 to second pin boss portion 31, to approximately equal circumferential lengths. Therefore, the maximum combustion load acts approximately at the middle of the circumferential length of second wide section 33.

Figure 11:
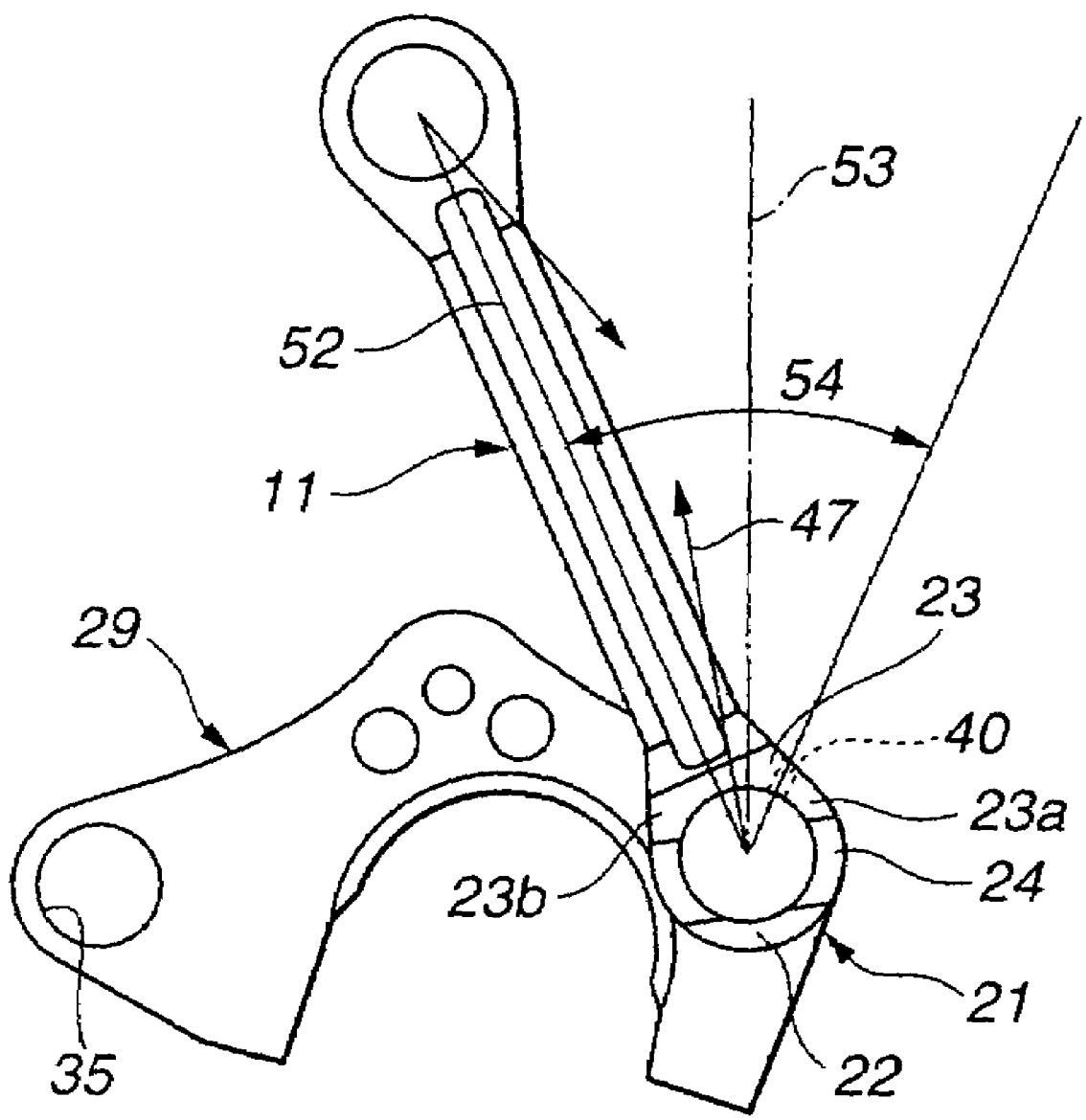
FIG. 11 is a schematic view illustrating the arrangement of links according to the first embodiment when a maximum expansion inertial load is applied.

FIG. 11 shows the linkage in the state reached when the maximum inertial load is applied. By the influence of the greatest inertial load, a direction 47 of the maximum expansion inertial load acting from first connecting pin 12 to first pin boss portion 21 (the sum of inertial load and combustion load) is deviated further from link center line 52 of upper link 11 in the rotational direction of crank pin 4 (clockwise direction as viewed in FIG. 11), beyond the application direction 45 of the maximum combustion load shown in FIG. 10. In order that the combustion load and expansion inertial load may be applied securely on wide section 23, wide section 23 is extended sufficiently in the circumferential direction to both sides of the middle region to which the maximum combustion load acts.

Figure 12:
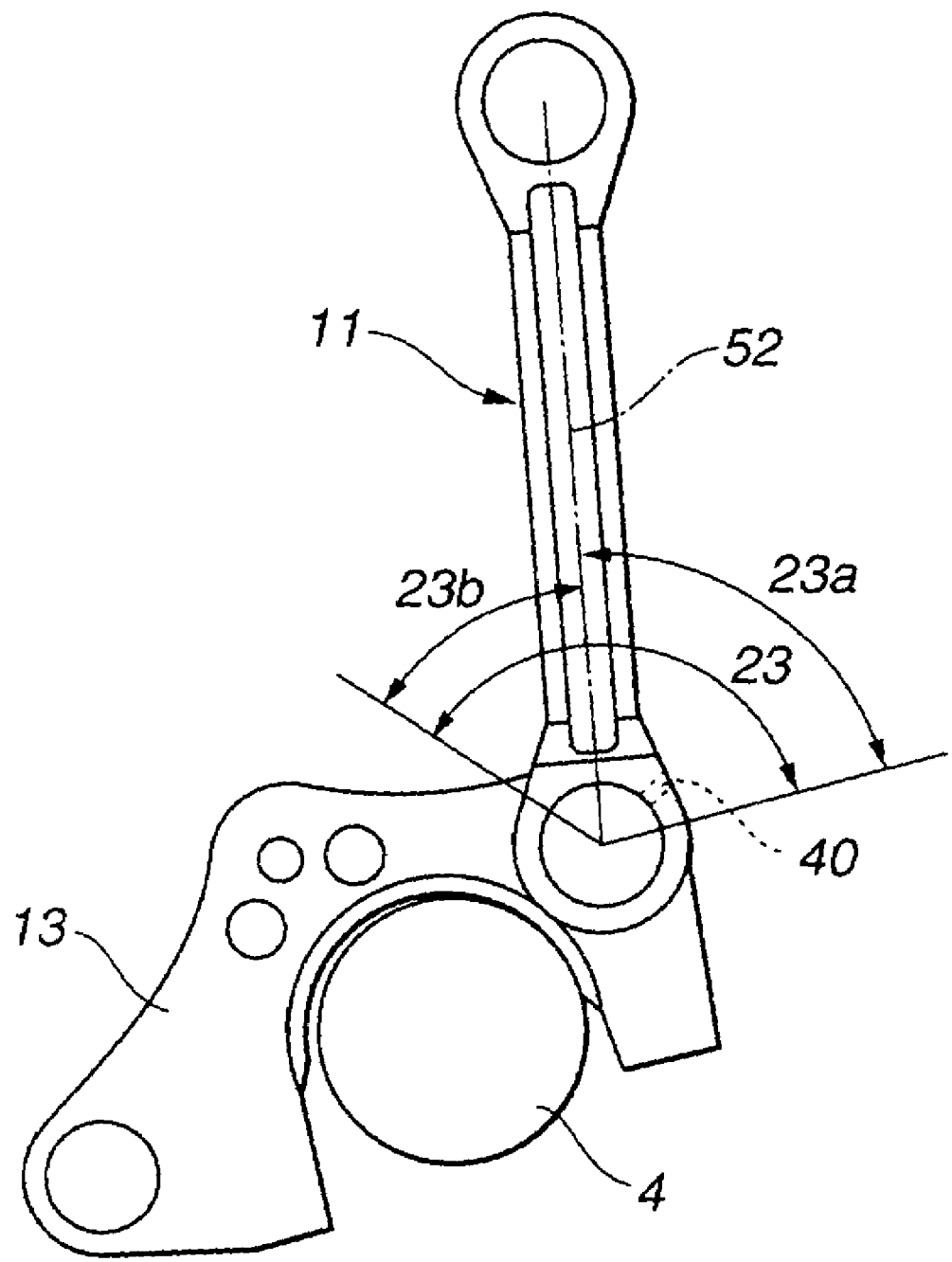
FIG. 12 is a schematic view showing a long subsection and a short subsection of a first wide section of the first pin boss portion shown in FIGS. 2, 3 and 4.

As shown in FIG. 12, first wide section 23 is somewhat asymmetric with respect to link center line 52 of upper link 11. First wide section 23 of this example includes a long subsection 23a extending from link center line 52 in a first rotational direction (clockwise direction as viewed in FIG. 12) away from crank pin 4; and a short subsection 23b extending from link center line 52 in a second rotational direction (counterclockwise direction) toward crank pin 4. The circumferential length of short subsection 23b is smaller than that of long subsection 23a. In the long subsection 23a, there is formed an oil hole 40 passing radially through a cylindrical wall to the pin hole for first connecting pin 12.

Figure 14A:
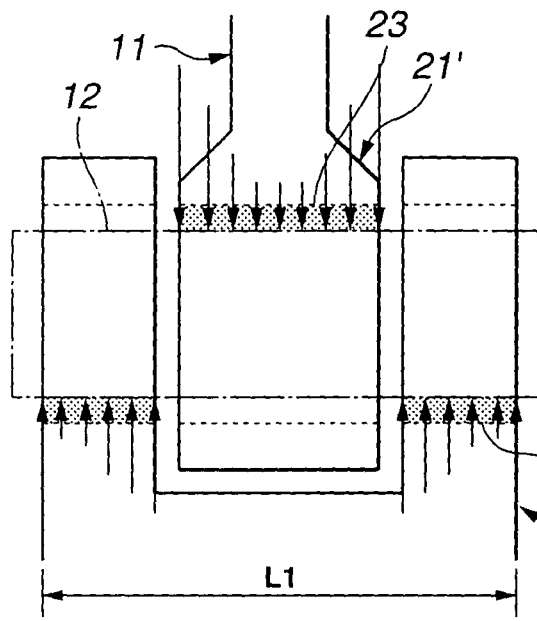
FIG. 14A is a schematic view showing distribution of forces applied to a connecting pin from pin boss portions in the comparative example of FIG. 13A.
Figure 14B:
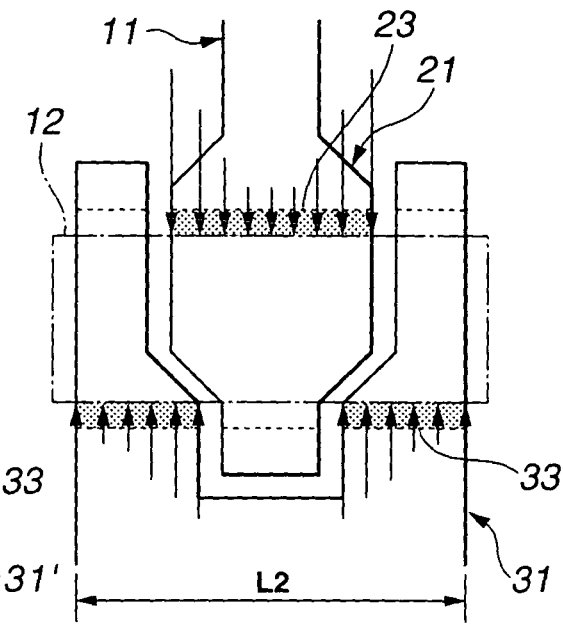
FIG. 14B is a schematic view showing distribution of forces applied to the connecting pin from the pin boss portions in the example according to the first embodiment shown in FIG. 13B.
Figure 14C:
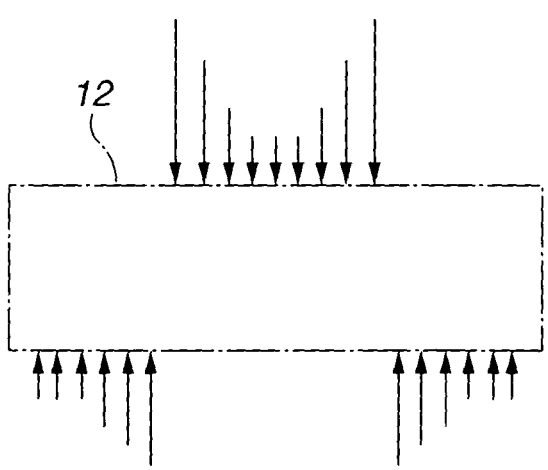
FIG. 14C is a schematic view showing bending stress in the connection pin in the comparative example of FIG. 14A.
Figure 14D:
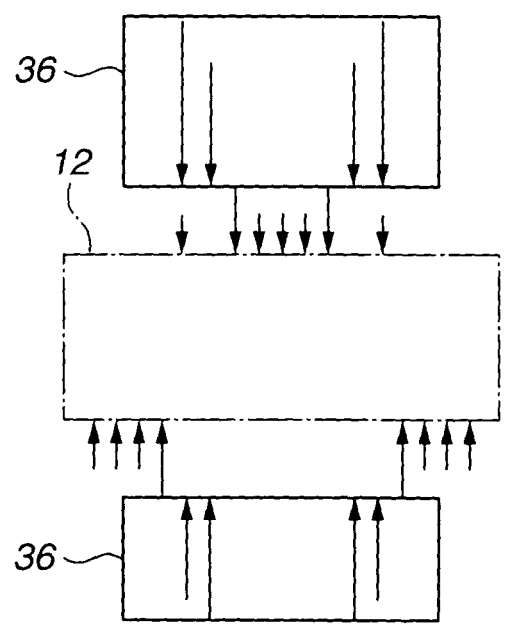
FIG. 14D is a schematic view showing bending stress in the connecting pin in the example of the embodiment shown in FIG. 14B.

FIGS. 13B, 14B and 14D illustrate the structure and distribution of bending stress in the link mechanism according to the first embodiment of the present invention in comparison with a pin connecting link mechanism, as a comparative example, composed of plain first and second pin boss portions having a uniform axial width over the entire circumference.

The axial width L1 or L2 of the pin connecting portion including first and second pin boss portions (the distance between the axial end outside surfaces of the second pin boss portions on both sides) of each of the plan pin connecting link mechanism of the comparative example and the pin connecting link mechanism of the embodiment is made smaller to prevent interference with a counterweight 17 of crank shaft 3 shown in FIG. 1. However, the axial size L1 of the comparative example becomes greater than the axial size L2 of the pin if the axial width (or bearing area) of each pin boss portion for receiving combustion load and expansion inertial load is held equal to that of the embodiment. The whole axial dimension L1 of the comparative example is greater than the whole axial dimension L2 of the embodiment by an amount (ΔD×2) determined by an axial overlap distance between the first and second pin boss portions. The pin connecting link mechanism according to the embodiment makes it possible to reduce the entire axial dimension L2 without reducing the axial widths of pin boss portions 21 and 31 for supporting great combustion load and expansion inertial load. In other words, the design of the embodiment makes it possible to improve the strength of the pin boss portions effectively by partly increasing the axial width of each pin boss portion, without increasing the entire axial dimension L2. Therefore, this embodiment can achieve both of the conflicting requirements, size reduction and enhancement in strength of pin boss portions 21 and 31.

FIGS. 14B and 14D illustrate bending stress in first connecting pin 12 when combustion load or expansion inertial load is applied, in comparison with the comparative example shown in FIGS. 14A and 14C. In the example of the embodiment shown in FIGS. 14B and 14D, first connecting pin 12 receives loads in opposite directions from first wide section 23 and second wide section 33. Therefore, forces schematically shown in blocks 36 counteract each other in the overlapping regions where a part of first wide section 23 and a part of second wide section 33 on each are located in the same axial position, so that the bending stress is decreased significantly as compared to the comparative example. This overlapping layout makes it possible to reduce the diameter and weight of first connecting pin 12. By decreasing the bending stress in first connecting pin 12, the overlapping layout can restrain one-sided abutment of first connecting pin 12 on pin boss portions 21 and 31, and significantly decrease the friction in the bearing structures of first connecting pin 12 by first and second pin boss portions 21 and 31.

As shown in FIG. 8, the direction of the exhaust inertial load acting from first connecting pin 12 to first pin boss portion 21 is opposite to the direction of the combustion load and the expansion inertial load. Therefore, exhaust inertial load acts in the contact regions between first connecting pin 12 and the narrow sections 22 and 32. In this case, therefore, the layout of this embodiment cannot achieve the above-mentioned effect of decreasing the bending stress. However, the exhaust inertial load is small enough as compared to the combustion load, and therefore, the bending stress due to the exhaust inertial load is small enough and not problematical in practice.

As shown in FIG. 10, upper link 11 is swung to the furthest position from crank pin 4 (in the clockwise direction in FIG. 10) with respect to lower link 13 when the maximum combustion load is applied. First wide section 23 is asymmetric with respect to link center line 52, and the longer subsection 23a extends from link center line 52 to the side to which the direction 45 of the maximum combustion load is inclined. This asymmetric layout makes it possible to increase the circumferential length of first wide section 23 sufficiently without causing interference between first wide section 23 and second pin boss portions 31 of lower link 13.

The circumferential length of second wide section 33 of lower link 13 is shorter than the thus-increased circumferential length of first wide section 23. However, as shown in FIGS. 5~7, the approximately cylindrical second pin boss portion 31 on each side of lower link 13 is reinforced by an integrally formed rib 37 extending in parallel to a direction perpendicular to the axial direction of the circular pin hole of the pin boss portion 31. The rigidity and strength around second pin boss portion 31 are sufficient against stress concentration, as compared to upper link 11. Therefore, it is possible to limit second wide sections 33 to a relatively short circumferential range in which greater combustion load is applied, and thereby to decrease the weight of lower link 13.

Oil hole 40 formed in long subsection 23a of first wide section 23 secures effective lubrication for long subsection 23a which receives greater load such as the maximum combustion load and maximum expansion inertial load. Because of its longer axial wall thickness, first wide section 23 is rigid enough despite the formation of oil hole 40. As shown in FIG. 5, oil hole 40 is opened upward on the opposite side to crank pin 4, so that lubricating oil can be introduced smoothly into oil hole 40.

As shown in FIG. 5, an aperture 42 facing to the outside circumferential surface of first connecting pin 12 is formed in the region in which the first narrow section 22 or first slant section 24 of first pin boss portion 21 confronts axially the second narrow section 32 or second slant section 34. Through this aperture 42, the lubricating oil is introduced smoothly to the bearing portions between first connecting pin 12 and the pin boss portions 21 and 31.

Figures 15A, 15B:
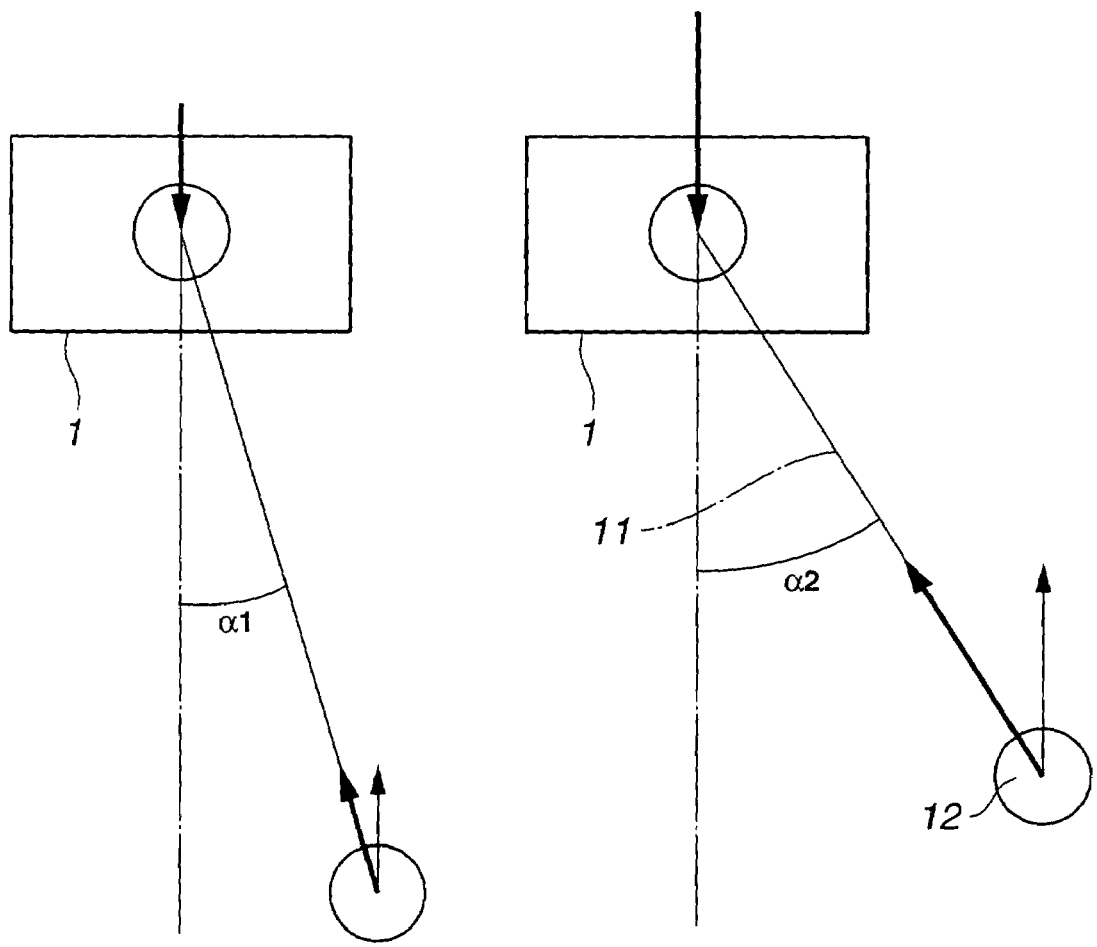
FIG. 15A is a view illustrating a single-link type piston crank mechanism.
FIG. 15B is a view illustrating a multi-link type piston crank mechanism employed in the embodiment.
Figure 16:
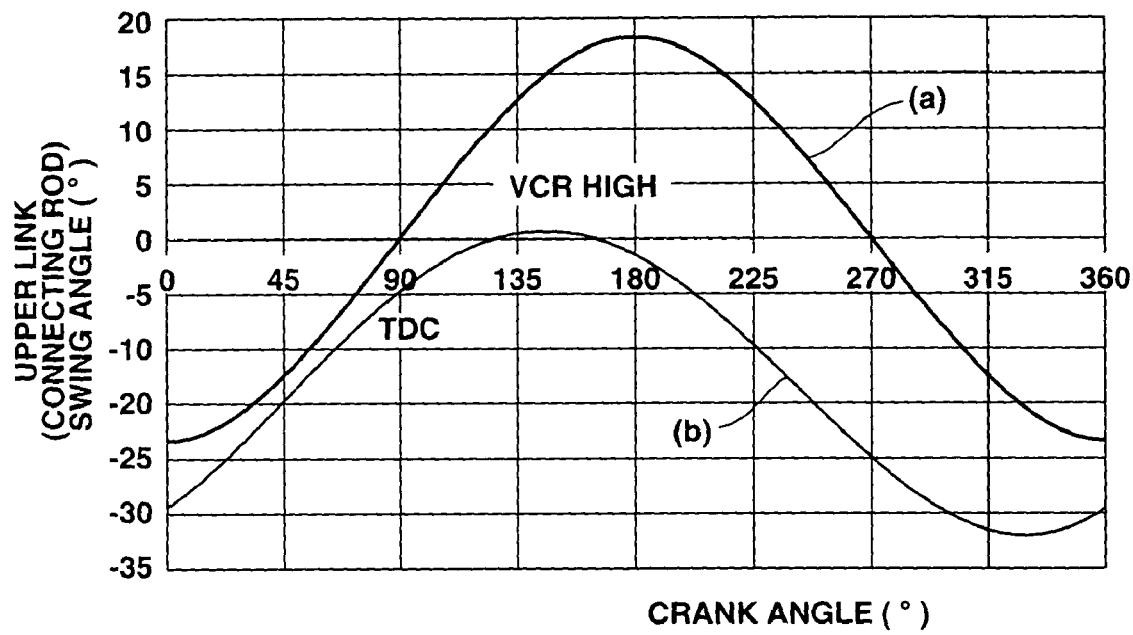
FIG. 16 is a graph showing characteristics of a swing angle between a connecting rod and an upper link in the single link type piston crank mechanism (a) shown in FIG. 15A, and in the multi-link type piston crank mechanism employed in the embodiment.
Figure 17:
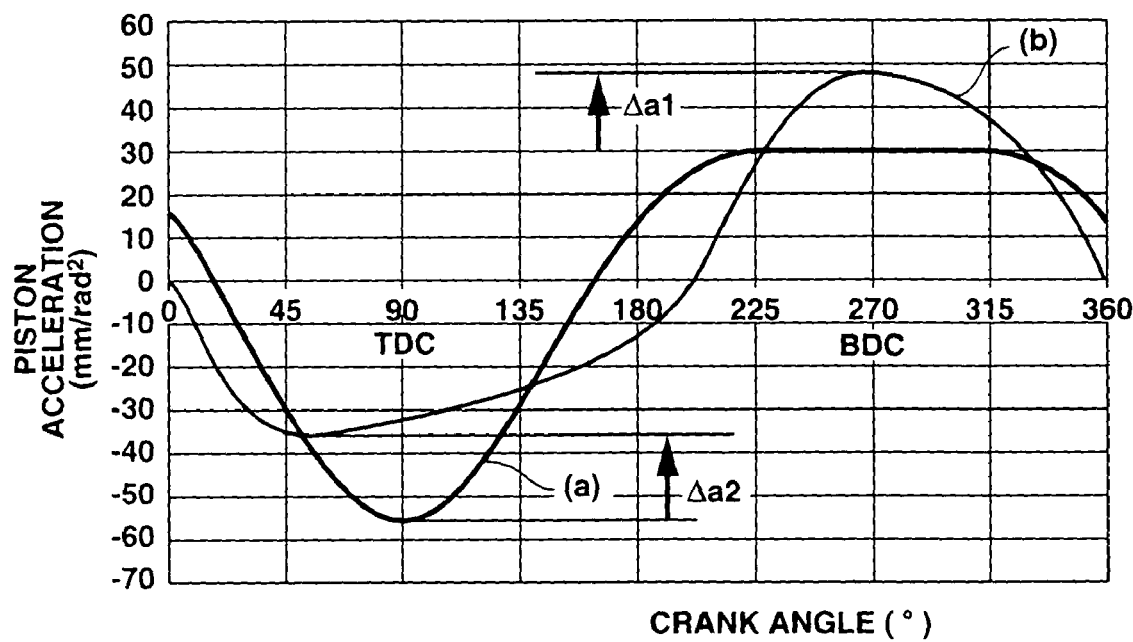
FIG. 17 is a graph showing characteristics of a piston acceleration in the single link type piston crank mechanism (a) shown in FIG. 15A, and in the multi-link type piston crank mechanism employed in the embodiment shown in FIG. 15B.

FIG. 15B and curved lines (b) in FIGS. 16 and 17 illustrate the characteristics of the multi-link piston-crank mechanism including the variable compression ratio mechanism according to the embodiment, in comparison with FIG. 15A and curved lines (a) in FIGS. 16 and 17 illustrating the characteristics of a single link type piston-crank mechanism in which a piston pine and a crank pin are connected by a single connecting rod. The vertical axis of FIG. 16 shows the swing angle of the upper link (connecting rod) with respect to a piston reciprocating axis.

In the case of the single link mechanism of FIG. 15A, because of its structural restriction, the magnitude (absolute value) of the maximum piston acceleration near the top dead center is greater than the magnitude of the minimum piston acceleration near the bottom dead center. In the multi-link mechanism of this embodiment, by contrast, the piston stroke is made closer to simple harmonic motion to improve the combustion and to reduce higher vibration components. Therefore, as compared to the single link mechanism, the absolute value of maximum piston acceleration near top dead center is decreased by $\Delta a2$, and the minimum piston acceleration is increased by $\Delta a1$. Moreover, the piston speed near piston top dead center is lower than the piston speed near piston bottom dead center. Therefore, as compared to the single link mechanism, the expansion inertial load near bottom dead center is increased, and the exhaust inertial load near top dead center is decreased. As shown in FIGS. 15A and 15B, the swing angle $\alpha2$ at which the expansion inertial load is applied is greater than the corresponding swing angle $\alpha1$ of the single link mechanism. Therefore, the compression load acting on the pin boss portions due to the expansion inertial load is increased as compared to the single link mechanism. However, the first wide section 23 having the relatively wide axial width receives the compression load and restrains. The tension load due to the exhaust inertial load near bottom dead center is applied to the first narrow section 22 having the relatively narrow axial width to the disadvantage of the strength. This tension load is decreased sufficiently as compared to the single link mechanism.

Figure 18:
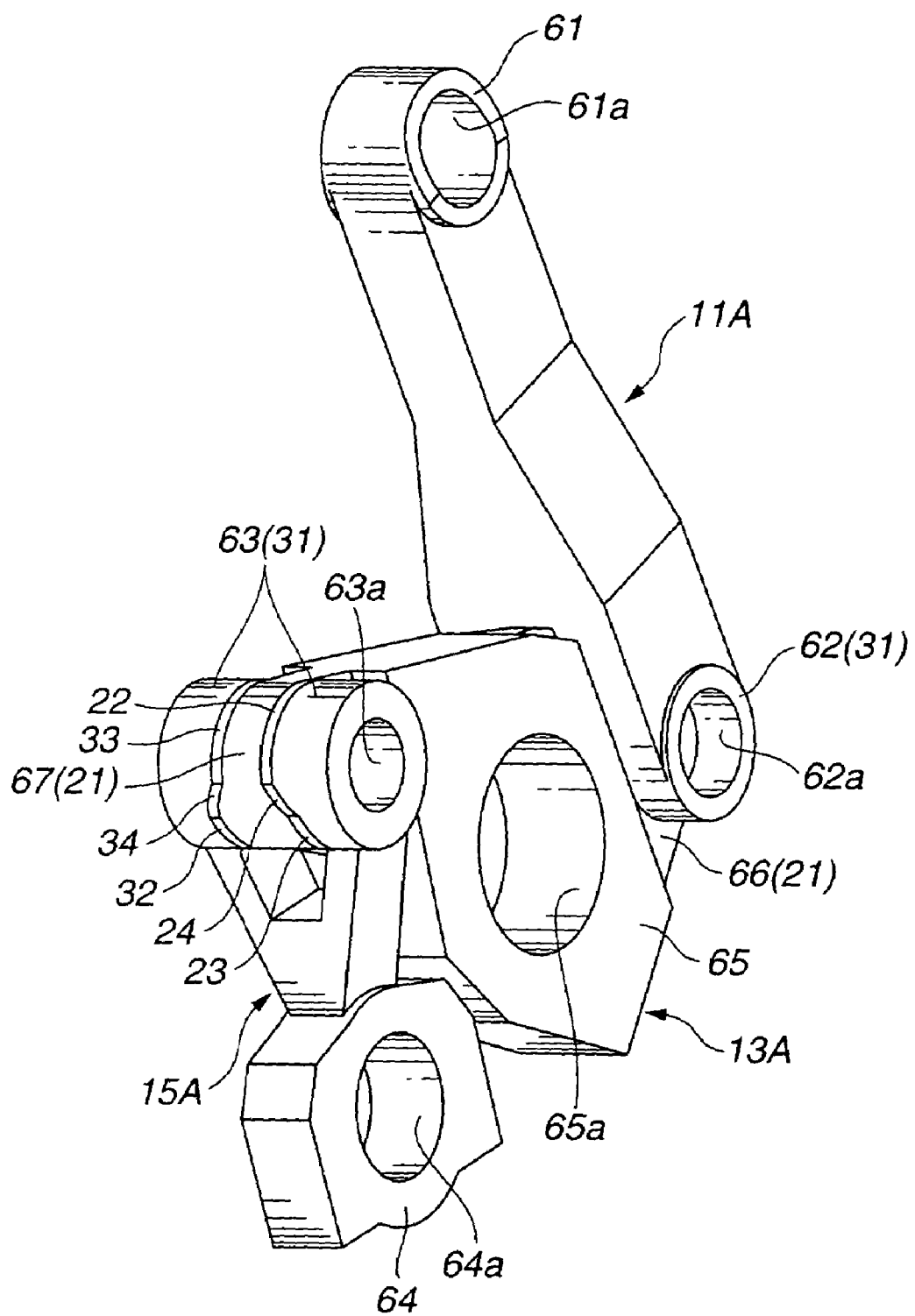
FIG. 18 is a perspective view showing a pin connected link mechanism of a variable compression ratio mechanism according to a second embodiment of the present invention.
Figure 19:
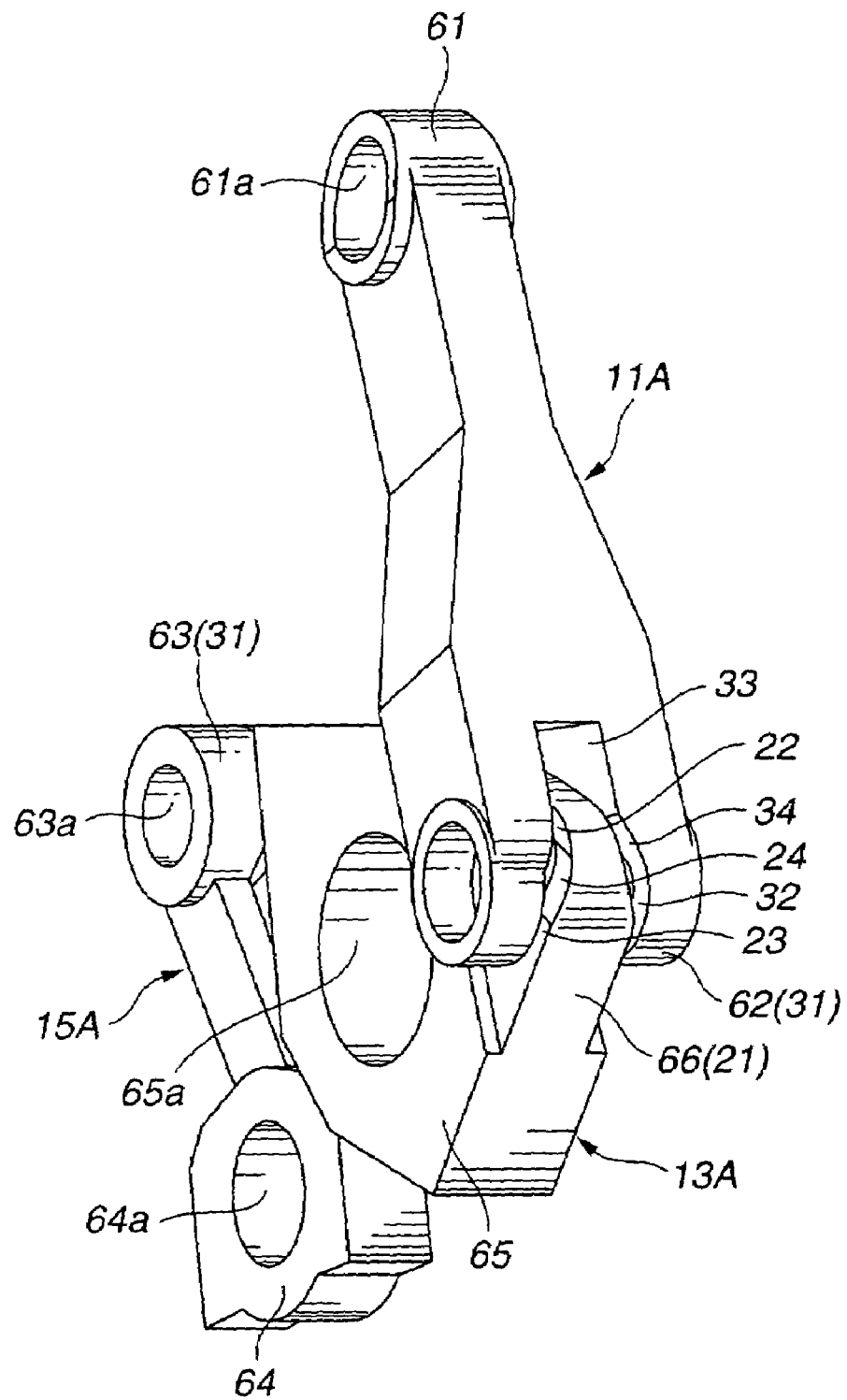
FIG. 19 is a perspective view showing the pin connected link mechanism of the variable compression ratio mechanism according to the second embodiment of the present invention.

FIGS. 18 and 19 show a variable compression ratio mechanism for an internal combustion engine according to a second embodiment of the present invention. The variable compression ratio according to the second embodiment is basically the same as the mechanism of the first embodiment, but different from the mechanism of the first embodiment in the following points.

As shown in FIGS. 18 and 19, and FIG. 1, the variable compression ratio mechanism according to the second embodiment is composed of a lower link 13A rotatably mounted on crank pin 4 of crankshaft 3; an upper link 11A connecting lower link 13A and piston 1; and a control link 15A connecting lower link 13A and eccentric cam 19 of control shaft 18, as in the first embodiment. Thus, the variable compression ratio mechanism can vary and control the engine compression ratio by varying the motion constraint condition of lower link 13A by rotating control shaft 18.

Upper link 11A includes a piston pin bearing portion 61 formed at one end of upper link 11A, and an upper link pin boss portion 62 formed at the other end. Piston pin bearing portion 61 is approximately cylindrical and formed with a bearing surface 61a for receiving piston pin 2. Upper link pin boss portion 62 is formed with a pin hole 62a for receiving first connecting pin 12.

Control link 15A includes a control link pin boss portion 63 formed at one end of control link 15A, and an eccentric cam bearing portion 64 formed at the other end of control link 15A. Control link pin boss portion 63 is formed with a pin hole 63a for receiving second connecting pin 14. Eccentric cam bearing portion 64 is formed with a bearing surface 64a for fitting over eccentric cam 19.

Lower link 13A includes a main bearing portion 65 formed with a bearing surface 65a for receiving crank pin 2; a first lower link pin boss portion 66 shaped like a plate and formed with a pin hole for receiving first connecting pin 12; and a second lower link pin boss portion 67 shaped like a plate and formed with a pin hole for receiving second connecting pin 14.

Upper link pin boss portion 62 is U-shaped or bifurcated like a clevis, and arranged to hold the plate-like first lower link pin boss portion 66 axially from both sides. Namely, upper link pin boss portion 62 has a U-shaped recess between two arms each formed with pin hole 62a. First lower link pin boss portion 66 is placed in the U-shaped recess between the two arms of upper link pin boss portion 62 in the axial direction of the first connecting pin 12. Upper link 11A includes a tapered section whose wall thickness is increased gradually from the piston pin bearing portion 61 to the bifurcated upper link pin boss portion 62.

Control link pin boss portion 63 is U-shaped or bifurcated like a clevis, and arranged to hold the plate-like second lower link pin boss portion 67 axially from both sides. Namely, control link pin boss portion 63 has a U-shaped recess between two arms each formed with pin hole 63a. Second lower link pin boss portion 67 is placed in the U-shaped recess between the two arms of control link pin boss portion 63 in the axial direction of the second connecting pin 14. Control link 15A includes a tapered section whose wall thickness is increased gradually from the eccentric cam bearing portion 64 to the bifurcated control link pin boss portion 63.

Lower link 13A is a single integral unit, unlike lower link 13 of the first embodiment which is in the form of an assembly of parts joined together by bolts. Main bearing portion 65, and pin boss portions 66 and 67 are integral parts of lower link 13A as shown in FIGS. 18 and 19. In order to reduce the axial dimension of the link mechanism while maintaining the bearing strength of main bearing portion 65, the first and second lower link pin boss portions 66 and 67 are reduced in wall thickness in the axial direction as compared to the main bearing portion 65 having a uniform wall thickness. Each of the first and second lower link pin boss portions 66 and 67 projects integrally outwards from the middle in the axial thickness of main bearing portion 65.

Each of first and second lower link boss portions 66 and 67 corresponds to first (inner) pin boss portion 21 according to the first embodiment. Each of first and second lower link boss portions 66 and 67 has a cylindrical wall defining a circular hole. The cylindrical wall is not uniform in axial width or axial wall thickness. That is, the cylindrical wall of each lower link pin boss portion 66 or 67 includes a first narrow section 22 having a constant axial width; a first wide section 23 having a constant axial width which is greater than the axial width of first narrow section 22; and a pair of first slant sections 24 connecting the first narrow section 22 and first wide section 23 on both sides of the circular hole. Each first slant section 24 has end surfaces which are inclined with respect to the plane to which the axial direction is perpendicular. Each slant section 24 is tapered so that the axial width is decreased gradually from first wide section 23 toward first narrow section 22.

Each of upper link pin boss portion 62 and control link pin boss portion 63 corresponds to the second (outer) pin boss portion 31 according to the first embodiment. Each pin boss portion 62 or 63 has a cylindrical wall defining a circular hole. The cylindrical wall is not uniform in axial width. That is, the cylindrical wall of the pin boss portion 62 or 63 includes a second narrow section 32 having a constant axial width; a second wide section 33 having a constant axial width which is greater than the axial width of second narrow section 32; and a pair of second slant sections 34 connecting the second narrow section 32 and second wide section 33 on both sides of the circular hole. Each slant section 34 has end surfaces which are inclined with respect to the plane to which the axial direction is perpendicular. Each second slant section 34 is tapered so that the axial width is decreased gradually from se In each of the pin connecting structures, first wide section 23 confronts second narrow section 32; and second wide portion 33 confronts first narrow section 22. The first wide portion 23 and second wide portion 33 are overlapped in the axial direction over a predetermined axial width. Therefore, the pin connecting structure according to the second embodiment can achieve both of improvement of the strength and reduction of the axial width.

The operations and effects of the variable compression ratio mechanism according to the second embodiment are different from those of the mechanism according to the first embodiment in the following points.

In the first embodiment, lower link 13 is in the form of an assembly of the crank pin main bearing member 28 and the separate side members 29 formed with pin boss portions, to prevent concentration of load from upper link 11 in the axial end portions of the crank pin bearing surface. By contrast, in the second embodiment, the bifurcation of the upper link pin boss portion 62 increases the reciprocating inertial load of upper link 11A. However, the combustion load and inertial load acting from upper link 11A to lower link 13A are inputted through first lower link pin boss portion 66, to the axial middle portion of crank pin bearing surface 65a. Therefore, lower link 13A does not incur the load concentration (one-sided abutment) in both axial end portions of crank pin bearing surface 65a. Lower link 13A shaped like a plate is simple in construction and light in weight. The structure of the second embodiment is advantageous for the lubrication of crank pin bearing surface 65a.

Similarly, control link pin boss portion 63 is bifurcated whereas second lower link pin boss portion is plate-shaped. This pin boss structure can simplify the configuration of lower link 13A, decrease the weight of lower link 13A, prevent the concentration of the load acting from control link 15A in both axial end portions of crank pin bearing surface 65a, and improve the lubrication. The bifurcation of control link pin boss portion 63 increases the weight of control link 15A itself. However, in control link 15A, the load acting on lower link 13A is small as compared to upper link 11A receiving the combustion load. Moreover, the motion of control link 15A is slower than the motion of upper link 11A, and the inertial load of control link 15A is smaller. Therefore, the increase of weight of control link 15A has little adverse influence.

The lower link pin boss portions 66 and 67 are simple in construction and integral with the main bearing portion 65. The lower link 13A is advantageous in manufacturing, assemblage, and weight.

In the case of lower link 15A having the one-piece structure as shown in FIGS. 18 and 19, it is not possible to mount lower link 15A on the crank pin afterwards. Therefore, it is optional to employ a halved structure for the lower link.

The present invention is not limited to the illustrated embodiments. In the first embodiment, the invention is applied to the connection between upper link and lower link. However, the invention is applicable to the connection between the control link and lower link in the same manner.

This application is based on a prior Japanese Patent Application No. 2002-363228 filed on Dec. 16, 2002. The entire contents of this Japanese Patent Application No. 2002-363228 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A link mechanism comprising:
   a first link including a cylindrical first pin boss portion;
   a second link including a cylindrical second pin boss portion; and
   a connecting pin passing through the first and second pin boss portions so as to allow a relative rotational movement between the first and second links within a limited range;
   the first pin boss portion including a first narrow section extending in a circumferential direction of the first pin boss portion, and having an axial wall thickness as measured in an axial direction of the connecting pin;
   the first pin boss portion further including a first wide section extending in the circumferential direction of the first pin boss portion, and having an axial wall thickness greater than the axial wall thickness of the first narrow section;
   the second pin boss portion including a second narrow section extending in a circumferential direction of the second pin boss portion, and having an axial wall thickness as measured in the axial direction;
   the second pin boss portion including a second wide section extending in the circumferential direction of the second pin boss portion, and having an axial wall thickness greater than the axial wall thickness of the second narrow section;
   the first wide section of the first pin boss portion and the second wide section of the second pin boss portion overlap each other in the axial direction;
   wherein the link mechanism further comprises a third link linked with one of the first and second links, to form a linkage of the first, second and third links connected with a piston of an internal combustion engine;
   wherein one of the first and second links is a lower link rotatably mounted on a crank pin of a crankshaft for the engine;
   wherein the first wide section of the first link includes a short subsection extending circumferentially from a link center line of the first link in a first rotational direction, and a long subsection extending from the link center line of the first link in a second rotational direction opposite to the first rotational direction, and having a circumferential length greater than a circumferential length of the short subsection.

2. The link mechanism as claimed in claim 1, wherein the first wide section confronts the second narrow section in the axial direction, and the second wide section confronts the first narrow section in the axial direction.

3. The link mechanism as claimed in claim 1, wherein the second link includes first and second side walls each formed with the cylindrical second pin boss portion and second narrow and wide sections of the second pin boss portion, the first wide section of the first pin boss portion is placed in the axial direction between the second narrow sections of the first and second side walls, and the first narrow section is placed in the axial direction between the second wide sections of the first and second side walls.

4. The link mechanism as claimed in claim 1, wherein the link mechanism further comprises an actuating section to vary a compression ratio of the engine.

5. The link mechanism as claimed in claim 4, wherein the first and second links are so arranged that a combustion load due to a combustion pressure acting on the piston is applied to the connecting pin from the first and second wide sections.

6. The link mechanism as claimed in claim 1, wherein the short subsection of the first link extends circumferentially toward a swing axis about which the second link is swingable, and the long subsection of the first link extends circumferentially away from the swing axis of the second link; and the first link extends from a first end defining a link connecting point, to a second end formed with the first pin boss portion defining another link connecting point, and the link center line of the first link is a line connecting the link connecting points of the first and second ends of the first link.

7. The link mechanism as claimed in claim 1, wherein the long subsection is formed with an oil hole passing radially through the long subsection.

8. A link mechanism comprising:
a first link including a cylindrical first pin boss portion;
a second link including a cylindrical second pin boss portion; and
a connecting pin passing through the first and second pin boss portions so as to allow a relative rotational movement between the first and second links within a limited range;
the first pin boss portion including a first narrow section extending in a circumferential direction of the first pin boss portion, and having an axial wall thickness as measured in an axial direction of the connecting pin;
the first pin boss portion further including a first wide section extending in the circumferential direction of the first pin boss portion, and having an axial wall thickness greater than the axial wall thickness of the first narrow section;
the second pin boss portion including a second narrow section extending in a circumferential direction of the second pin boss portion, and having an axial wall thickness as measured in the axial direction;
the second pin boss portion including a second wide section extending in the circumferential direction of the second pin boss portion, and having an axial wall thickness greater than the axial wall thickness of the second narrow section;
the first wide section of the first pin boss portion and the second wide section of the second pin boss portion overlap each other in the axial direction;
wherein the link mechanism further comprises a third link linked with one of the first and second links, to form a linkage of the first, second and third links connected with a piston of an internal combustion engine;
wherein one of the first and second links is a lower link rotatably mounted on a crank pin of a crankshaft for the engine;
wherein the link mechanism is a variable engine compression ratio mechanism so arranged that a piston speed near a top dead center of the piston is slower than a piston speed near a bottom dead center of the piston.

9. A link mechanism comprising:
a first link including a cylindrical first pin boss portion;
a second link including a cylindrical second pin boss portion; and
a connecting pin passing through the first and second pin boss portions so as to allow a relative rotational movement between the first and second links within a limited range;
the first pin boss portion including a first narrow section extending in a circumferential direction of the first pin boss portion, and having an axial wall thickness as measured in an axial direction of the connecting pin;
the first pin boss portion further including a first wide section extending in the circumferential direction of the first pin boss portion, and having an axial wall thickness greater than the axial wall thickness of the first narrow section;
the second pin boss portion including a second narrow section extending in a circumferential direction of the second pin boss portion, and having an axial wall thickness as measured in the axial direction;
the second pin boss portion including a second wide section extending in the circumferential direction of the second pin boss portion, and having an axial wall thickness greater than the axial wall thickness of the second narrow section;
the first wide section of the first pin boss portion and the second wide section of the second pin boss portion overlap each other in the axial direction;
wherein the link mechanism further comprises a third link linked with one of the first and second links, to form a linkage of the first, second and third links connected with a piston of an internal combustion engine;
wherein one of the first and second links is a lower link rotatably mounted on a crank pin of a crankshaft for the engine;
wherein the second link is the lower link rotatably mounted on the crank pin, the first link is an upper link connecting the lower link and the piston of the engine; the lower link includes a bifurcated end portion including first and second side arms each of which is formed with the second pin boss portion; and the first pin boss portion is placed between the second pin boss portions of the first and second side arms of the lower link.

10. A link mechanism comprising:
a first link including a cylindrical first pin boss portion;
a second link including a cylindrical second pin boss portion; and
a connecting pin passing through the first and second pin boss portions so as to allow a relative rotational movement between the first and second links within a limited range;
the first pin boss portion including a first narrow section extending in a circumferential direction of the first pin boss portion, and having an axial wall thickness as measured in an axial direction of the connecting pin;
the first pin boss portion further including a first wide section extending in the circumferential direction of the first pin boss portion, and having an axial wall thickness greater than the axial wall thickness of the first narrow section;
the second pin boss portion including a second narrow section extending in a circumferential direction of the second pin boss portion, and having an axial wall thickness as measured in the axial direction;
the second pin boss portion including a second wide section extending in the circumferential direction of the second pin boss portion, and having an axial wall thickness greater than the axial wall thickness of the second narrow section;

the first wide section of the first pin boss portion and the second wide section of the second pin boss portion overlap each other in the axial direction;

wherein the link mechanism further comprises a third link linked with one of the first and second links, to form a linkage of the first, second and third links connected with a piston of an internal combustion engine;

wherein one of the first and second links is a lower link rotatably mounted on a crank pin of a crankshaft for the engine;

wherein the first link is the lower link rotatably mounted on the crank pin, the second link is an upper link connecting the lower link and the piston of the engine; the upper link includes a bifurcated end portion including first and second side arms each of which is formed with the second pin boss portion; and the first pin boss portion is placed between the second pin boss portions of the first and second side arms of the upper link.

11. A link mechanism comprising:

a first link including a cylindrical first pin boss portion;

a second link including a cylindrical second pin boss portion; and a connecting pin passing through the first and second pin boss portions so as to allow a relative rotational movement between the first and second links within a limited range;

the first pin boss portion including a first narrow section extending in a circumferential direction of the first pin boss portion, and having an axial wall thickness as measured in an axial direction of the connecting pin;

the first pin boss portion further including a first wide section extending in the circumferential direction of the first pin boss portion, and having an axial wall thickness greater than the axial wall thickness of the first narrow section;

the second pin boss portion including a second narrow section extending in a circumferential direction of the second pin boss portion, and having an axial wall thickness as measured in the axial direction;

the second pin boss portion including a second wide section extending in the circumferential direction of the second pin boss portion, and having an axial wall thickness greater than the axial wall thickness of the second narrow section;

the first wide section of the first pin boss portion and the second wide section of the second pin boss portion overlap each other in the axial direction;

wherein the link mechanism further comprises a third link linked with one of the first and second links, to form a linkage of the first, second and third links connected with a piston of an internal combustion engine;

wherein one of the first and second links is a lower link rotatably mounted on a crank pin of a crankshaft for the engine;

wherein the first link is the lower link rotatably mounted on the crank pin, the second link is a control link connecting the lower link to an actuating section; the control link includes a bifurcated end portion including first and second side arms each of which is formed with the second pin boss portion; and the first pin boss portion is placed between the second pin boss portions of the first and second side arms of the control link.

12. A link mechanism comprising:

a first link including a cylindrical first pin boss portion;

a second link including a cylindrical second pin boss portion; and a connecting pin passing through the first and second pin boss portions so as to allow a relative rotational movement between the first and second links within a limited range;

the first pin boss portion including a first narrow section extending in a circumferential direction of the first pin boss portion, and having an axial wall thickness as measured in an axial direction of the connecting pin;

the first pin boss portion further including a first wide section extending in the circumferential direction of the first pin boss portion, and having an axial wall thickness greater than the axial wall thickness of the first narrow section;

the second pin boss portion including a second narrow section extending in a circumferential direction of the second pin boss portion, and having an axial wall thickness as measured in the axial direction;

the second pin boss portion including a second wide section extending in the circumferential direction of the second pin boss portion, and having an axial wall thickness greater than the axial wall thickness of the second narrow section;

the first wide section of the first pin boss portion and the second wide section of the second pin boss portion overlap each other in the axial direction;

wherein the link mechanism further comprises a third link linked with one of the first and second links, to form a linkage of the first, second and third links connected with a piston of an internal combustion engine;

wherein one of the first and second links is a lower link rotatably mounted on a crank pin of a crankshaft for the engine;

wherein the lower link includes a main bearing portion formed with a hole for receiving the crank pin, and first and second swing arms which project from the main bearing portion in different directions and which are connected, respectively, with the other links;

wherein the main bearing portion, and the first and second swing arms of the lower link are integral parts of the lower link.

13. A piston crank mechanism for varying a compression ratio of an internal combustion engine, comprising:

a lower link mounted rotatably on a crank pin of the engine;

an upper link connecting the lower link with a piston of the engine;

a control link including a first end connected with the lower link; and a support point adjusting mechanism connected with a second end of the control link and arranged to shift a support point of the second end of the control link to vary a compression ratio of the engine;

one of the lower link, the upper link and the control link being a first link, a second link being another of the lower link, the upper link and the control link, the first link including a cylindrical first pin boss portion;

the second link including a cylindrical second pin boss portion connected with the first pin boss portion by a connecting pin passing through the first and second pin boss portions so as to allow a relative rotational movement between the first and second links;

the first pin boss portion including a first narrow section extending in a circumferential direction of the first pin boss portion, and having an axial wall thickness as measured in an axial direction of the connecting pin;

the first pin boss portion further including a first wide section extending in the circumferential direction of the first pin boss portion, and having an axial wall thickness greater than the axial wall thickness of the first narrow section;

the second pin boss portion including a second narrow section extending in a circumferential direction of the second pin boss portion, and having an axial wall thickness as measured in the axial direction;

the second pin boss portion including a second wide section extending in the circumferential direction of the second pin boss portion, and having an axial wall thickness greater than the axial wall thickness of the second narrow section;

the first wide section of the first pin boss portion and the second wide section of the second pin boss portion overlap each other in the axial direction;

wherein the first wide section of the first link includes a short subsection extending circumferentially from a link center line of the first link in a first rotational direction, and a long subsection extending from the link center line of the first link in a second rotational direction opposite to the first rotational direction, and having a circumferential length greater than a circumferential length of the short subsection.

* * * * *